US009465986B2

(12) United States Patent
Okada et al.

(10) Patent No.: US 9,465,986 B2
(45) Date of Patent: Oct. 11, 2016

(54) INFORMATION PROCESSING APPARATUS, METHOD, AND NON-TRANSITORY COMPUTER READABLE MEDIUM FOR CREATING ELECTRONIC BOOKMARKED INFORMATION

(71) Applicant: FUJI XEROX CO., LTD., Minato-ku, Tokyo (JP)

(72) Inventors: Shigeru Okada, Kanagawa (JP); Minoru Sodeura, Kanagawa (JP); Shinji Hanaoka, Kanagawa (JP); Hiroyoshi Uejo, Kanagawa (JP); Sei Amagai, Kanagawa (JP); Kazuhiro Oya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 141 days.

(21) Appl. No.: 13/908,549

(22) Filed: Jun. 3, 2013

(65) Prior Publication Data
US 2014/0099038 A1 Apr. 10, 2014

(30) Foreign Application Priority Data

Oct. 4, 2012 (JP) ................................. 2012-222131

(51) Int. Cl.
G06K 9/00 (2006.01)
(52) U.S. Cl.
CPC ................................. G06K 9/00469 (2013.01)
(58) Field of Classification Search
CPC .................................................. G06K 9/00469
See application file for complete search history.

(56) References Cited

U.S. PATENT DOCUMENTS

| 5,438,426 | A | 8/1995 | Miake et al. |
| 6,185,588 | B1 * | 2/2001 | Olson-Williams .......... G06F 17/30896 707/E17.118 |
| 7,573,615 | B2 * | 8/2009 | Kasatani ........................ 358/402 |
| 2004/0024662 | A1 * | 2/2004 | Gray et al. ....................... 705/29 |
| 2005/0149538 | A1 * | 7/2005 | Singh et al. ................... 707/100 |

(Continued)

FOREIGN PATENT DOCUMENTS

| JP | 06274592 A | 9/1994 |
| JP | 2000181931 A | 6/2000 |

(Continued)

OTHER PUBLICATIONS

Communication dated Jan. 20, 2016, from the Japanese Patent Office in counterpart application No. 2012-222131.

Primary Examiner — Siamak Harandi
Assistant Examiner — Amandeep Saini
(74) Attorney, Agent, or Firm — Sughrue Mion, PLLC

(57) ABSTRACT

An information processing apparatus includes a reading unit, a recognition unit, a table-of-contents analysis unit, a main-body analysis unit, and a creation unit. The reading unit reads a table of contents page and a main body page as images. The recognition unit performs character recognition on the images of the table of contents and main body pages. The table-of-contents analysis unit analyzes the image of the table of contents page, and acquires at least a heading item in accordance with a result of character recognition. The main-body analysis unit analyzes the image of the main body page, and associates an image including the heading item with the heading item in accordance with a result of character recognition. The creation unit creates electronic bookmarked information in which bookmark information for associating the heading item with the image of the main body page is added to electronic information of the read images.

10 Claims, 12 Drawing Sheets

(56) References Cited

U.S. PATENT DOCUMENTS

| | | | |
|---|---|---|---|
| 2007/0027749 A1* | 2/2007 | Peiro | G06Q 30/0241 705/14.4 |
| 2009/0052930 A1* | 2/2009 | Yoshimura | G03G 15/6588 399/81 |
| 2009/0073501 A1* | 3/2009 | Gutarin | 358/403 |
| 2009/0144605 A1* | 6/2009 | Radakovic et al. | 715/200 |
| 2010/0067064 A1* | 3/2010 | Shigehisa | H04N 1/40062 358/403 |
| 2012/0197908 A1* | 8/2012 | Unno | G06F 17/2745 707/749 |
| 2013/0258419 A1* | 10/2013 | Shimazu | 358/448 |

FOREIGN PATENT DOCUMENTS

| | | |
|---|---|---|
| JP | 2002-024796 A | 1/2002 |
| JP | 2005-085234 A | 3/2005 |
| JP | 2008245034 A | 10/2008 |

* cited by examiner

FIG. 11A    FIG. 11B

```
1 0 obj
  ⋮
endobj
  ⋮
7 0 obj
  ⋮   (CONTENT OF PAGE vii)
endobj
  ⋮
10 0 obj
  ⋮   (CONTENT OF PAGE 1)
endobj
  ⋮
52 0 obj
  ⋮   (CONTENT OF PAGE 43)
endobj
  ⋮
```

```
114 0 obj

/Dest [ 7 0 ⋯ ]
/Title (PREFACE)

endobj 115 0 obj

/Dest [ 10 0 ⋯ ]
/Title (INTRODUCTION TO XXX)

endobj 116 0 obj

/Dest [ 52 0 ⋯ ]
/Title (FUNDAMENTALS OF XXX)

endobj
```

INFORMATION PROCESSING APPARATUS, METHOD, AND NON-TRANSITORY COMPUTER READABLE MEDIUM FOR CREATING ELECTRONIC BOOKMARKED INFORMATION

CROSS-REFERENCE TO RELATED APPLICATIONS

This application is based on and claims priority under 35 USC 119 from Japanese Patent Application No. 2012-222131 filed Oct. 4, 2012.

BACKGROUND (i) Technical Field

The present invention relates to an information processing apparatus, an information processing method, and a non-transitory computer readable medium.

(ii) Related Art

In general, documents with tables of contents, such as technical documents, are read by using image reading devices and are converted into electronic documents, and the electronic documents are viewed on computer terminals or mobile electronic terminals. In this case, opening the desired page may be time-consuming and frustrating depending on the number of pages in the documents. A function of manually adding an electronic bookmark to a frequently referred to page and referring to the page using the electronic bookmark is available.

In a configuration for referring to the desired pages using the table of contents, in order to refer to the page of a certain desired item and thereafter the page of another item, a user returns to the page of the table of contents before searching for and specifying the item to be referred to next, and then refers to the page of the next item.

SUMMARY

According to an aspect of the invention, there is provided an information processing apparatus including a reading unit, a recognition unit, a table-of-contents analysis unit, a main-body analysis unit, and a creation unit. The reading unit reads an image of a table of contents page and an image of a main body page. The recognition unit performs character recognition to recognize a character in the image of the table of contents page and a character in the image of the main body page. The table-of-contents analysis unit analyzes the image of the table of contents page, and acquires at least a heading item in accordance with a result of the character recognition. The main-body analysis unit analyzes the image of the main body page, and associates an image including the heading item with the heading item in accordance with a result of the character recognition. The creation unit creates electronic bookmarked information in which bookmark information for associating the heading item with the image of the main body page is added to electronic information of the read images.

BRIEF DESCRIPTION OF THE DRAWINGS

An exemplary embodiment of the present invention will be described in detail based on the following figures, wherein:

FIGS. 11A and 11B illustrate an example of created electronic bookmarked information;

DETAILED DESCRIPTION

Figure 1:
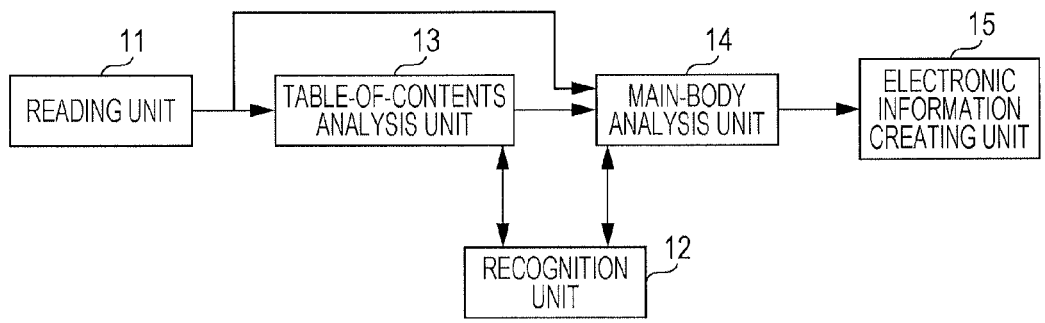
FIG. 1 is a block diagram illustrating an exemplary embodiment of the present invention.

FIG. 1 is a block diagram illustrating an exemplary embodiment of the present invention. By way of example, a given document may include a table of contents, and table of contents pages and main body pages, which follow the table of contents pages, may be read as images to create electronic information. The given document is not limited to a specific type and may be any type of document such as a file or a book.

A reading unit 11 reads the table of contents pages and the main body pages in the given document as images. When reading the document, the reading unit 11 may divide the document into the table of contents pages and the main body pages. Examples of the method of dividing the document into the table of contents pages and the main body pages include, as well as separately reading the table of contents pages and the main body pages, regarding a predetermined number of images as table of contents pages and the subsequent images as main body pages, determining table of contents pages and main body pages by, using a function of detecting a color sheet, regarding the images before the color sheet as table of contents pages and the images subsequent to the color sheet as main body pages, and identifying table of contents pages and main body pages on the basis of the results of layout analysis and recognition performed by a recognition unit 12 described below. The table of contents pages and the main body pages may also be separated using any other method.

The recognition unit 12 recognizes characters in the read images. A known character recognition method may be used. In addition, not the entire images may undergo character recognition, and character recognition may be performed in accordance with the results of layout analysis. For example, character recognition may be performed on each item in the table of contents or each heading in the main body.

A table-of-contents analysis unit 13 performs layout analysis on the images of the table of contents pages read by the reading unit 11 on the basis of the sizes of characters, paragraphs, the positions of the characters, and so forth, and acquires at least heading items on the basis of the results of character recognition performed on each of the analyzed items by the recognition unit 12. Elements of the document, such as chapters and sections, may also be analyzed. Page numbers corresponding to the respective heading items may also be acquired.

A main-body analysis unit 14 analyzes the images of the main body pages read by the reading unit 11, and associates each of the heading items acquired by the table-of-contents analysis unit 13 with an image including the heading item on the basis of the results of character recognition. For example, the main-body analysis unit 14 may perform layout analysis on the images of the main body pages to extract the areas of headers and the like, and the recognition unit 12 may perform character recognition on the extracted areas. On the basis of the results of character recognition, each of the heading items acquired by the table-of-contents analysis unit 13 may be associated with a corresponding one of the images of the main body pages. Alternatively, the recognition unit 12 may perform character recognition on the areas of the page numbers in the images of the main body pages, and each of the heading items may be associated with a corresponding one of the images of the main body pages on the basis of the results of character recognition and the page numbers corresponding to the heading items.

An electronic information creating unit 15 associates the results of the analysis of the table of contents performed by the table-of-contents analysis unit 13 with the results of the extraction of the main body performed by the main-body analysis unit 14 to create bookmark information. Further, the electronic information creating unit 15 adds the bookmark information to electronic information of the images read by the reading unit 11 to create electronic bookmarked information.

Figure 2:
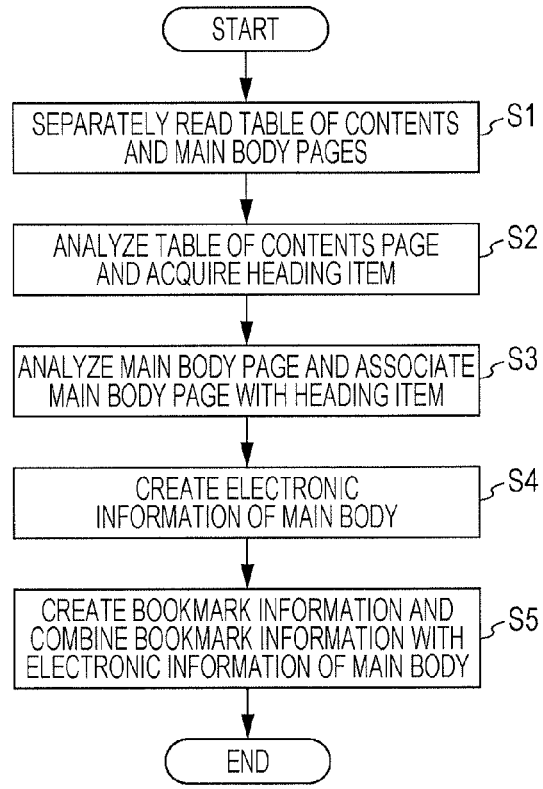
FIG. 2 is a flowchart illustrating an example of the operation according to the exemplary embodiment of the present invention.

FIG. 2 is a flowchart illustrating an example of the operation according to the exemplary embodiment of the present invention. In S1, the reading unit 11 separately reads table of contents pages and main body pages in a given document as images.

In S2, the table-of-contents analysis unit 13 analyzes the images of the table of contents pages read by the reading unit 11, and extracts the items in the table of contents. The recognition unit 12 performs character recognition on each of the extracted items to obtain a heading item. The table-of-contents analysis unit 13 may further acquire a page number corresponding to each of the heading items.

In S3, the main-body analysis unit 14 analyzes the images of the main body pages read by the reading unit 11, and extracts headings and the like. The recognition unit 12 performs character recognition on each of the extracted headings and the like. Alternatively, the main-body analysis unit 14 may extract the areas of the page numbers, and the recognition unit 12 may perform character recognition on each of the areas of the page numbers. Then, the main-body analysis unit 14 associates each of the heading items obtained from the table of contents with a corresponding one of the images of the main body pages.

In S4, the electronic information creating unit 15 creates electronic information of the main body. Further, in S5, the electronic information creating unit 15 associates the results of the analysis of the table of contents pages performed by the table-of-contents analysis unit 13 with the results of the extraction of the main body pages obtained by the main-body analysis unit 14 to create bookmark information. The electronic information creating unit 15 also creates electronic information of the images read by the reading unit 11, and combines the electronic information with the bookmark information to create electronic bookmarked information.

Figure 3A:
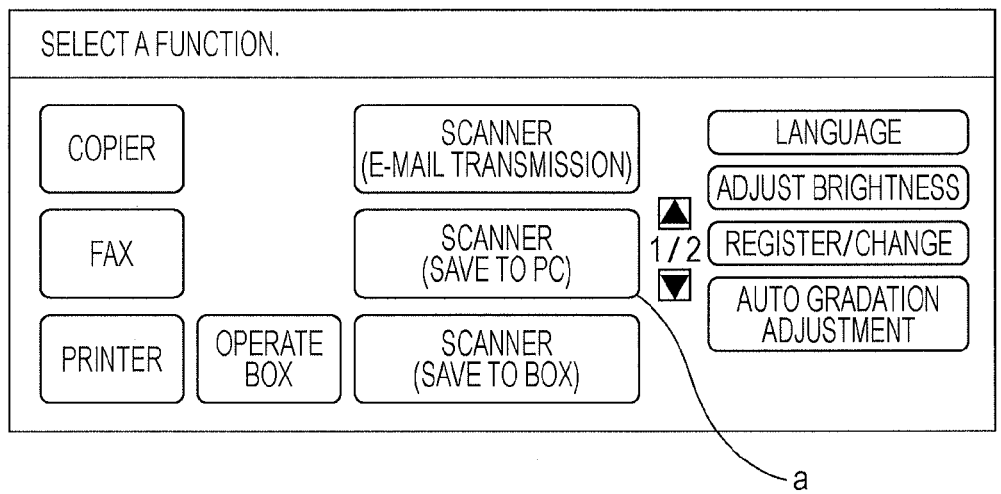
FIGS. 3A and 3B illustrate examples of screens for performing setting when reading a document.
Figure 3B:
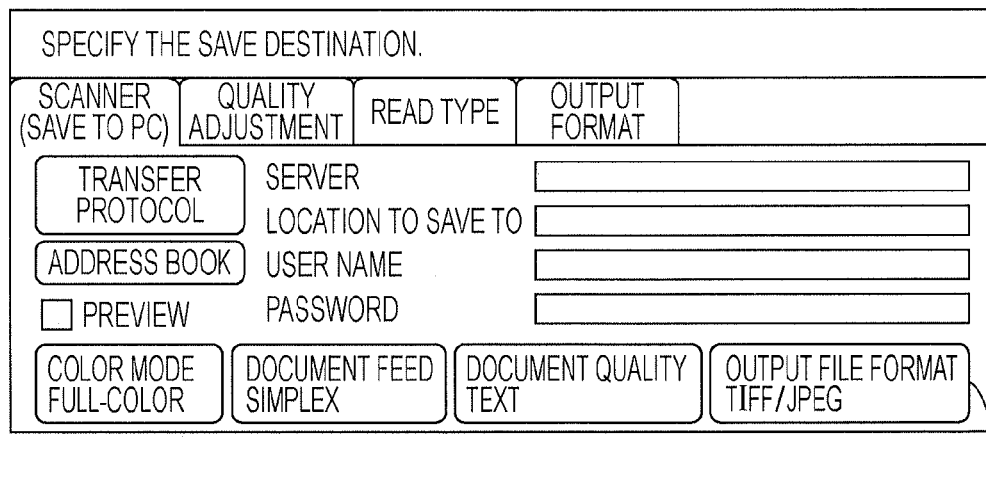

An example of the configuration and operation according to the exemplary embodiment of the present invention, described above, will be described in more detail hereinafter. FIGS. 3A, 3B, 4A, and 4B illustrate examples of screens for performing setting when reading a document. To create electronic information from a document, for example, the user selects the option "Scanner (Save To PC)", which is indicated by sign a, on a screen illustrated in FIG. 3A for selecting a function. Then, for example, a settings screen illustrated in FIG. 3B is displayed. To perform a process of creating electronic bookmarked information from the document described above, the user selects the option "Output File Format", which is indicated by sign b, on the settings screen illustrated in FIG. 3B to display an output file format settings screen illustrated in FIG. 4A. Here, by way of example, the option "PDF", which is indicated by sign c, is selected and the option "Bookmark Settings", which is indicated by sign d, is selected. As a result of the operations described above, a bookmark settings screen illustrated in FIG. 4B is displayed, and the option "Yes" in the option "Scan Bookmark", which is indicated by sign e, may be selected on the screen. On the bookmark settings screen illustrated in FIG. 4B, the option "Specify Separator", which is indicated by sign f, is used to specify the way in which the table of contents pages and the main body pages are to be separated and read. In the illustrated example, by way of example, one of the options "Separately Read Table Of Contents And Main Body Pages", "Specify Number Of Table Of Contents Pages", "Color sheet", and "Auto" is selected.

Figure 4B:
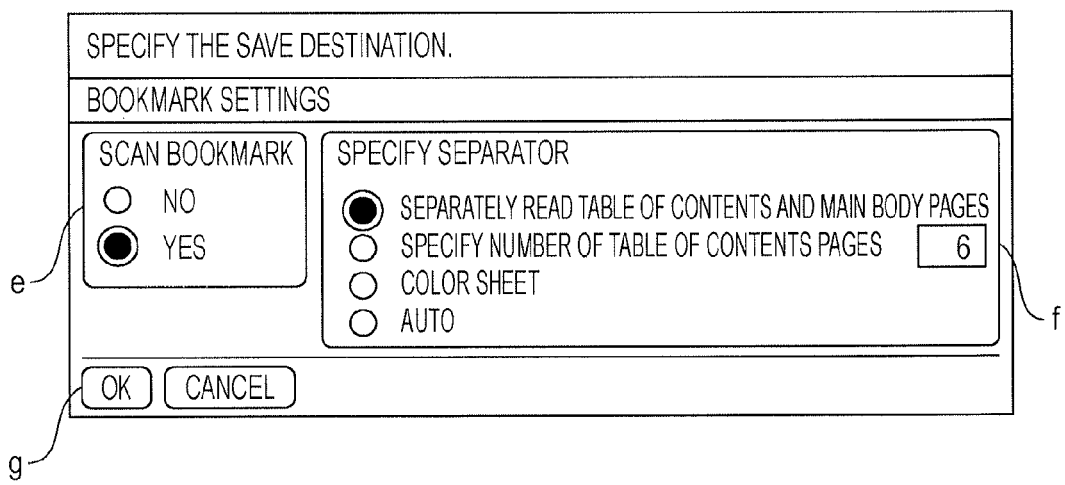
Figure 5:
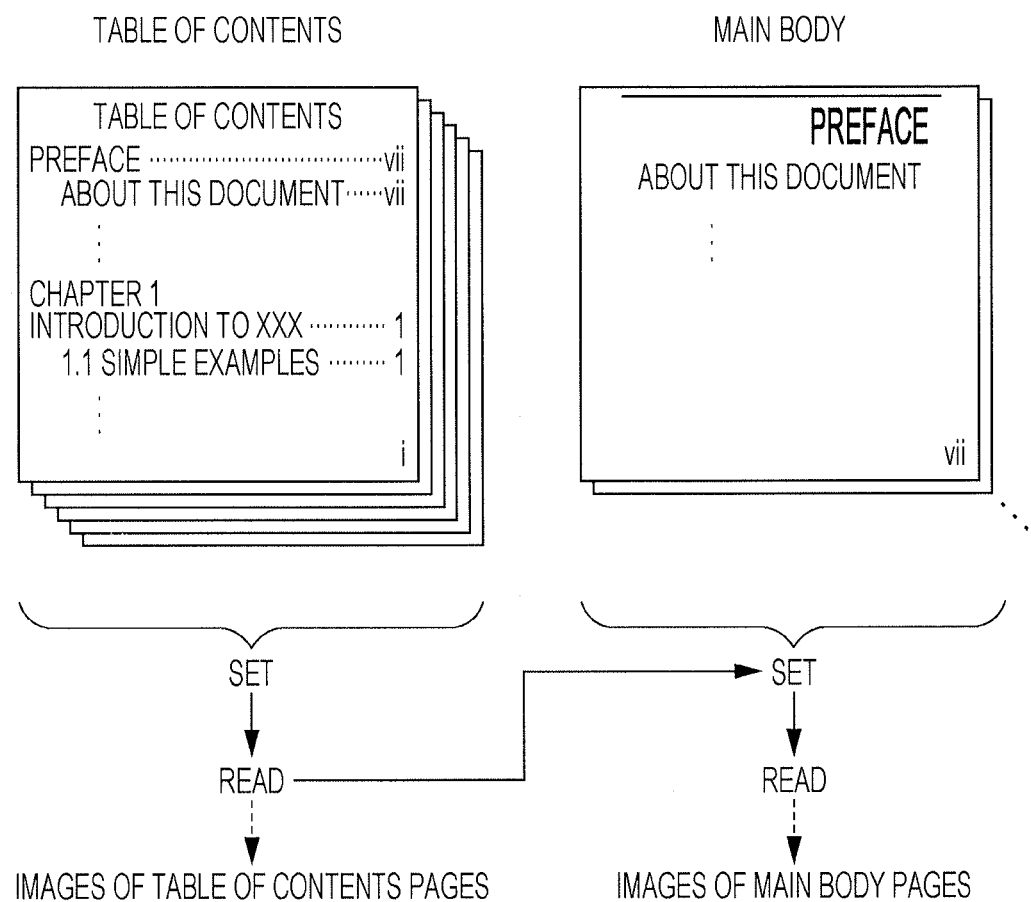
FIG. 5 illustrates the handling of a document in a case where table of contents pages and main body pages are to be separately read.

FIG. 5 illustrates the handling of a document in a case where table of contents pages and main body pages are to be separately read. For example, when the option "Separately Read Table Of Contents And Main Body Pages" is specified in the option "Specify Separator" on the bookmark settings screen illustrated in FIG. 4B and the "OK" button, which is indicated by sign g, is operated, table of contents pages and main body pages are separately read by the reading unit 11. FIG. 5 illustrates an example of the document. In the illustrated example, first, the document images corresponding to the table of contents pages are set and start to be read, and then the document images corresponding to the main body pages are set and start to be read when the reading of the table of contents pages is completed. Alternatively, conversely, the document images corresponding to the main body pages may be read first and then the document images corresponding to the table of contents pages may be read. In either way, the table of contents pages and the main body pages are separately read. This method allows table of contents pages and main body pages to be separated and read, but may involve both operations of reading the table of contents pages and reading the main body pages.

Figure 6A:
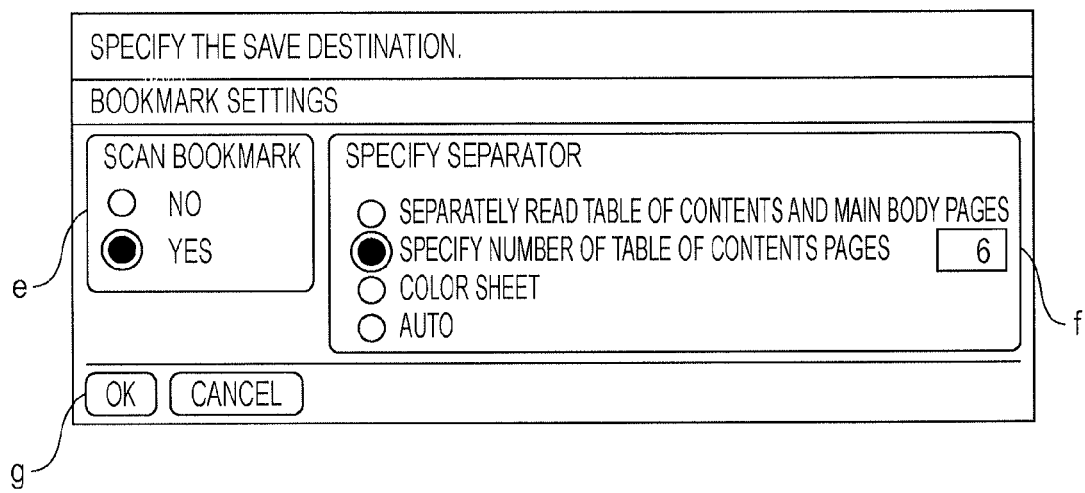
FIGS. 6A and 6B illustrate an example of reading base on the specified number of pages that a table of contents spans.
Figure 6B:
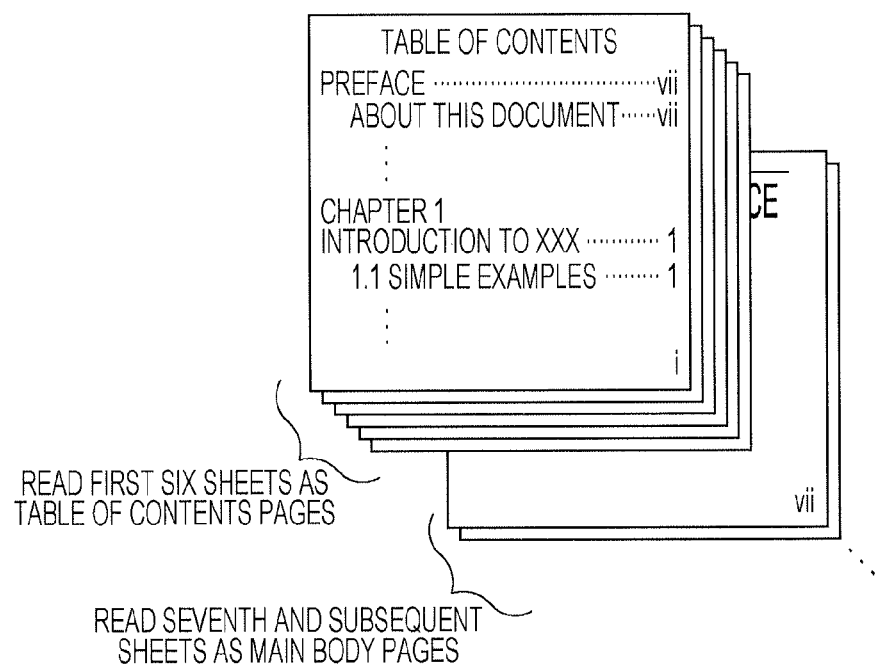

FIGS. 6A and 6B illustrate an example of reading based on the specified number of pages that a table of contents spans. FIG. 6A illustrates the bookmark settings screen illustrated in FIG. 4B, in which the option "Specify Number Of Table Of Contents Pages" is specified on the option "Specify Separator". In this case, the number of sheets is further set. Then, the "OK" button, which is indicated by sign g, is operated, and then an instruction for starting a reading operation is issued. In this case, for example, only pages, the number of which is equal to the specified number of sheets, starting from the first page in the read document images, are handled as table of contents pages, and the subsequent pages are handled as main body pages. In FIG. 6A, since the value "6" is specified as the number of sheets, as illustrated in FIG. 6B, the first to sixth of the document images are read as table of contents pages, and the seventh and subsequent document images are read as main body pages. It is to be noted that main body pages may be read first and then pages, the number of which is equal to the specified number of sheets, starting from the end may be read as table of contents pages. This method only requires table of contents pages and main body pages to be read only once, but may require the user to specify the number of sheets.

Figure 7A:
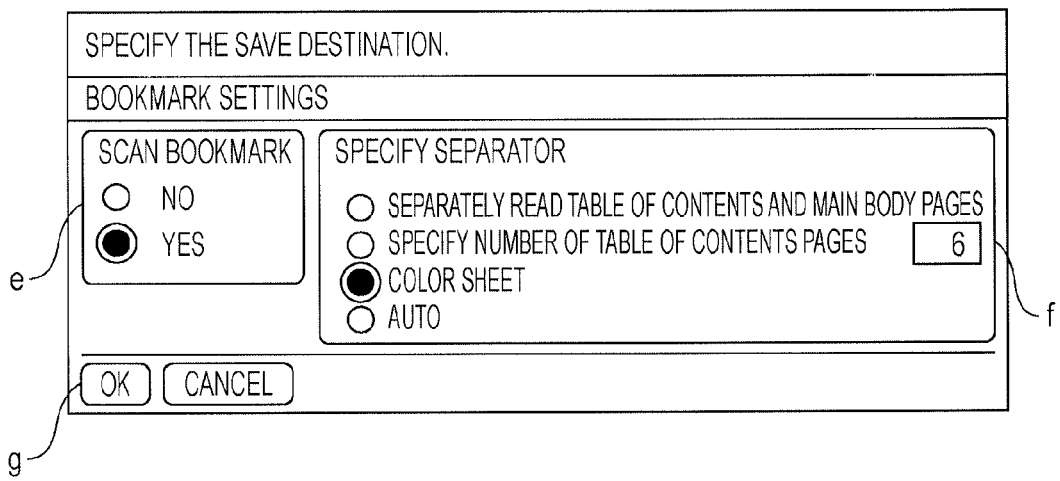
FIGS. 7A and 7B illustrate an example of reading based on the specification of a color sheet.
Figure 7B:
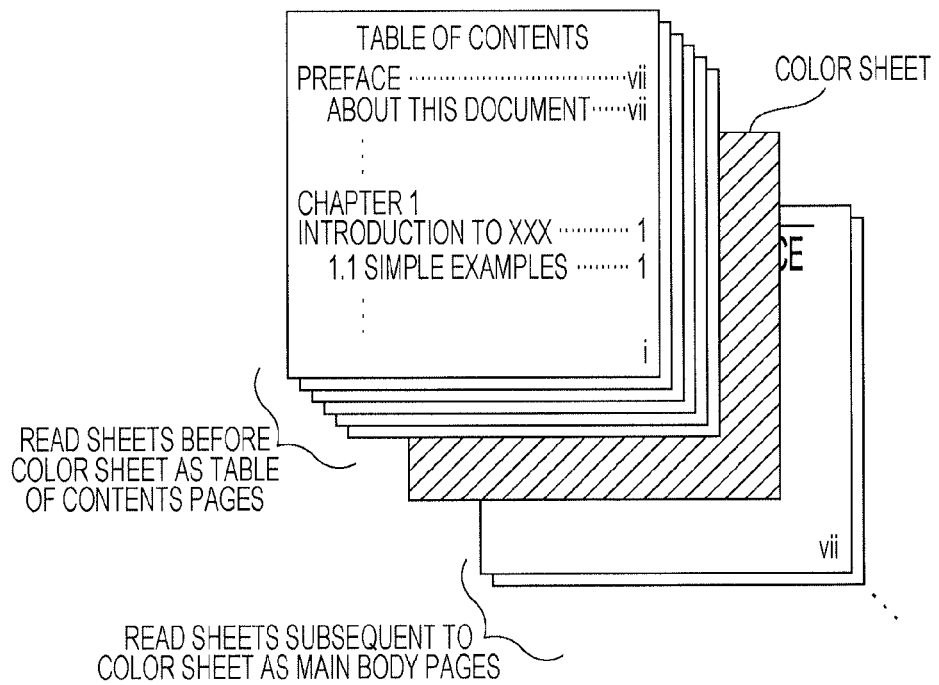

FIGS. 7A and 7B illustrate an example of reading based on the specification of a color sheet. FIG. 7A illustrates the bookmark settings screen illustrated in FIG. 4B, in which the option "Color sheet" is specified on the option "Specify Separator". Then, the "OK" button, which is indicated by sign g, is operated, and then an instruction for starting a reading operation is issued. In this case, as illustrated in FIG. 7B, a color sheet indicated by hatching lines is inserted between table of contents pages and main body pages in the document images. In the course of the reading operation, when the color sheet is detected, the sheets before the color sheet are handled as table of contents pages and the document images subsequent to the color sheet are handled as main body pages. It is to be noted that the sheets before the color sheet may be handled as main body pages and the sheets subsequent to the color sheet may be handled as table of contents pages. This method also only requires table of contents pages and main body pages to be read only once, but may require the insertion of a color sheet.

Figure 8A:
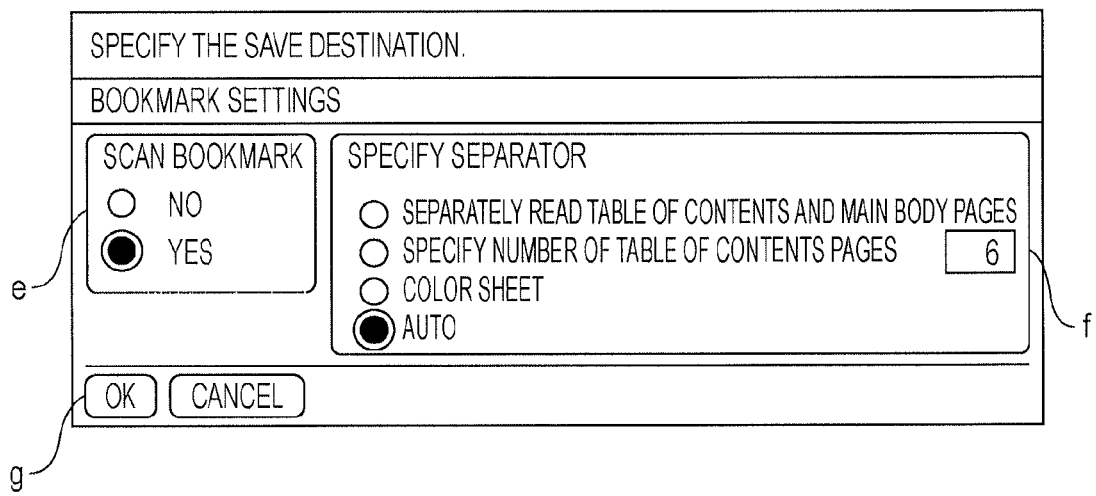
FIGS. 8A and 8B illustrate an example of reading based on a separator which is automatically specified.
Figure 8B:
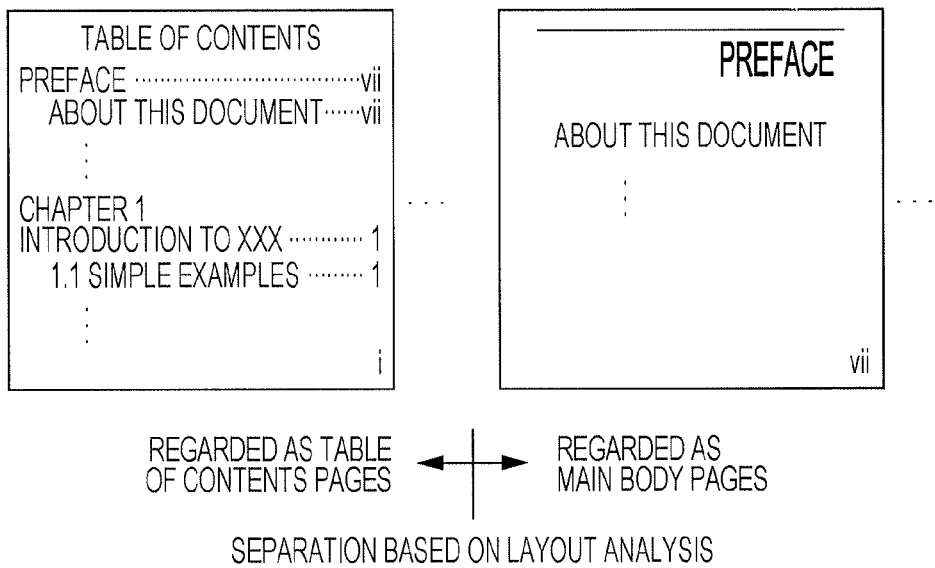

FIGS. 8A and 8B illustrate an example of reading based on a separator which is automatically specified. FIG. 8A illustrates the bookmark settings screen illustrated in FIG. 4B, in which the option "Auto" is specified on the option "Specify Separator". Then, the "OK" button, which is indicated by sign g, is operated, and then an instruction for starting a reading operation is issued. In this case, as illustrated in FIG. 8B, table of contents pages and main body pages are successively read. Then, the reading unit 11 performs layout analysis to separate the table of contents pages and the main body pages. Since a table of contents has a specific document structure such as the arrangement of items and page numbers, the table of contents may be identified by using a known technique. In the illustrated example, the table of contents pages, followed by the main body pages, are read. Instead, the main body pages, followed by the table of contents pages, may be read. This method allows table of contents pages and main body pages to be read without any consciousness of them, but may cause a detection error.

While four methods have been given here, any other method may be used to separately read table of contents pages and main body pages. In addition, the number of options to select from is not limited to four, and two, three, or more than four options may be used. The methods which may be used in that case are not limited to those described above. It is to be noted that a certain method may be used, in which no selection is made in the option "Specify Separator".

It is to be understood that the operation screens and the like used to read the images, described above, are examples and the exemplary embodiment is not limited to them.

After reading the table of contents pages and the main body pages, the table-of-contents analysis unit 13 performs layout analysis on the images of the table of contents pages on the basis of the sizes of the characters, indents, paragraphs, the positions of the characters, and so forth, and extracts the items in the table of contents. Then, the recognition unit 12 performs character recognition on each of the extracted items in the table of contents to obtain heading items. The recognized character string obtained as a heading item is used as a character string for creating a bookmark.

Figure 9A:
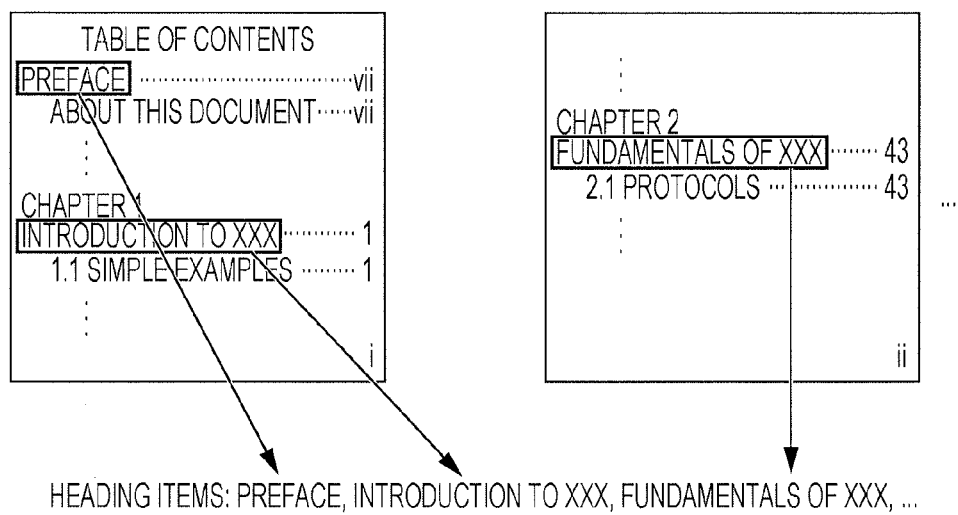
FIGS. 9A and 9B illustrate an example of the association between heading items and a main body.
Figure 9B:
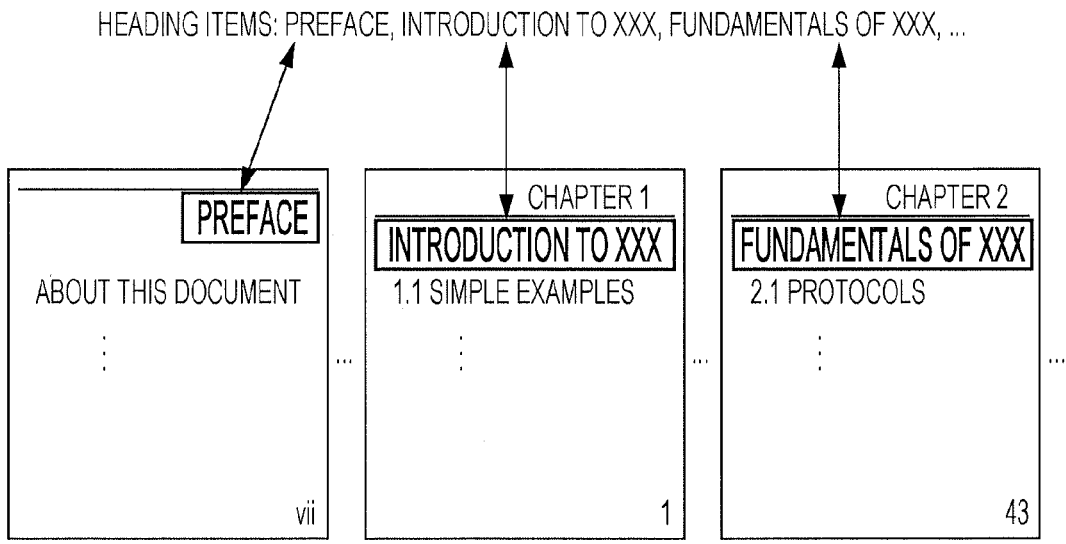

FIGS. 9A and 9B illustrate an example of the association between heading items and a main body. FIG. 9A illustrates an example of a table of contents. In the illustrated example, the table of contents includes the headlines "Preface", "Introduction to xxx" in Chapter 1, and "Fundamentals of xxx" in Chapter 2, and each of them has various headers (or subtitles) as its expanded items. In the illustrated example, the item "Preface" and the headers of the respective chapters, such as the items "Introduction to xxx" and "Fundamentals of xxx", are extracted, and the character strings of the extracted items are recognized. The subtitles may also be extracted and may be subjected to character recognition.

Further, the main-body analysis unit 14 analyzes the read images of the main body pages, and extracts headings and the like. The recognition unit 12 performs character recognition on each of the extracted headings and the like, and then the main-body analysis unit 14 associates the recognized characters with the heading items obtained from the table of contents. In the example of the main body pages illustrated in FIG. 9B, the headers are written in the upper parts of the individual pages in larger characters than the other characters. The headers are extracted through layout analysis, and are subjected to character recognition by the recognition unit 12. The headers, such as "Preface", "Introduction to xxx", and "Fundamentals of xxx", are extracted and are subjected to character recognition. The recognized characters and the heading items obtained by the table-of-contents analysis unit 13 are associated.

Figure 10A:
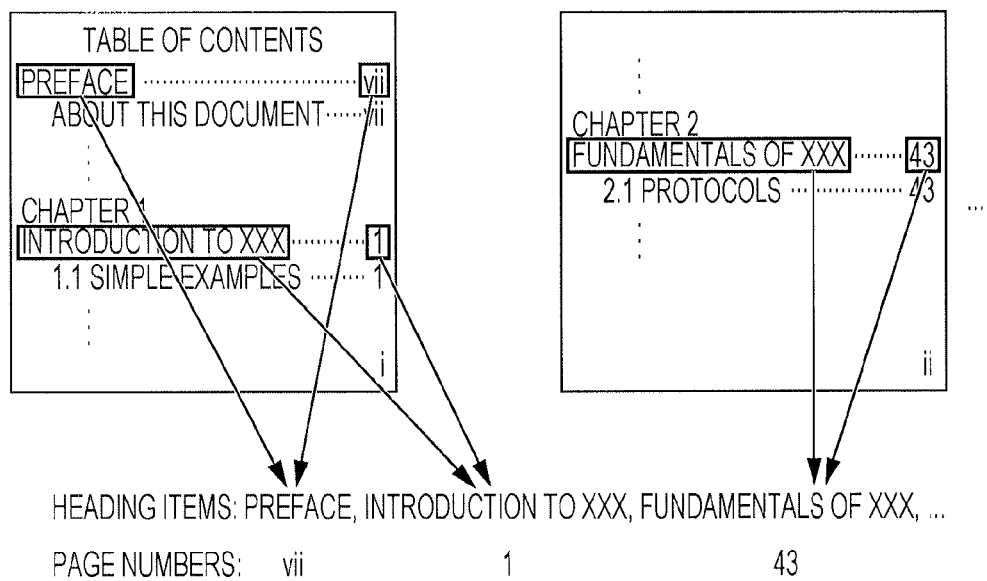
FIGS. 10A and 10B illustrate another example of the association between heading items and a main body.
Figure 10B:
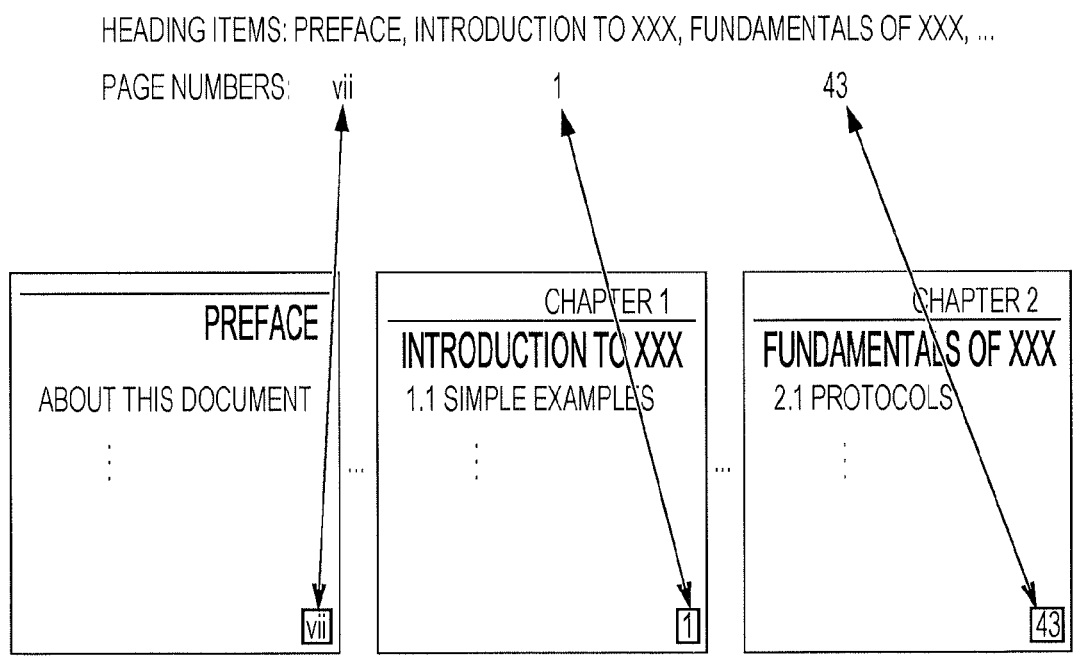

FIGS. 10A and 10B illustrate another example of the association between heading items and a main body. The table of contents generally has items serving as heading items, and page numbers on which the items are located. The table-of-contents analysis unit 13, when obtaining each heading item, also extracts and acquires the corresponding page number through character recognition. For example, in the example of the table of contents illustrated in FIG. 10A, "vii" is acquired as the page number corresponding to "Preface", "1" as the page number corresponding to "Introduction to xxx", and "43" as the page number corresponding to "Fundamentals of xxx".

From the images of the main body pages, the areas of the page numbers may be extracted and then subjected to character recognition, and the heading items may be associated with the images including the page numbers acquired by the table-of-contents analysis unit 13. If the areas of the page numbers are known, the page numbers and the heading items may be associated without using layout analysis. In the example illustrated in FIG. 10B, page numbers are located in the lower corners of the respective images. The page numbers may be extracted and then subjected to character recognition, and images corresponding to the page numbers acquired from the table of contents may be identified and associated with the heading items.

In the example of the table of contents illustrated in FIG. 10A, the page number assigned to the item "Preface" is not expressed in Arabic numerals. Even in the case of non-Arabic numerals, the sign representing a page number assigned to an item in the table of contents and the sign representing a page number assigned to the counterpart in the main body pages may be referred to and associated. Alternatively, if page numbers are expressed in non-Arabic numerals, page numbers assigned to items in the table of contents and page numbers assigned to the counterparts in the main body may be associated using the header extraction method described with reference to FIGS. 9A and 9B. While the table of contents is not extracted as a heading item, the heading item "Table Of Contents" may be created and associated with the images of the table of contents pages.

After the extraction of heading items from the table of contents and the association between the extracted heading items and the counterparts in the main body are completed, the electronic information creating unit 15 creates electronic information of the images read by the reading unit 11. The electronic information creating unit 15 also creates bookmark information in which bookmarks of the heading items are added to the associated main body pages in accordance with the results of the association between the heading items and the counterparts in the main body, and combines the bookmark information with the electronic information of the main body to create electronic bookmarked information.

FIGS. 11A and 11B illustrate an example of the created electronic bookmarked information. FIG. 11A illustrates an example of the electronic information of the images read by the reading unit 11, and illustrates the association with the images of the respective pages. In the illustrated example, the image of the first page of the table of contents is written as the first object, the image of the page including the header "Preface" as the seventh object, the image of the page including the header "Introduction to xxx" as the tenth object, and the image of the page including the header "Fundamentals of xxx" as the fifty-second object.

In the example of the bookmark information illustrated in FIG. 11B, each of the heading items is handled as an object, and "/Dest[" is followed by the object number of the image associated with the heading item, and "/Title" is followed by a character string of the heading item which is in parentheses. The illustrated bookmark information may be combined with the electronic information of the images read by the reading unit 11 to create electronic bookmarked information.

Figure 12A:
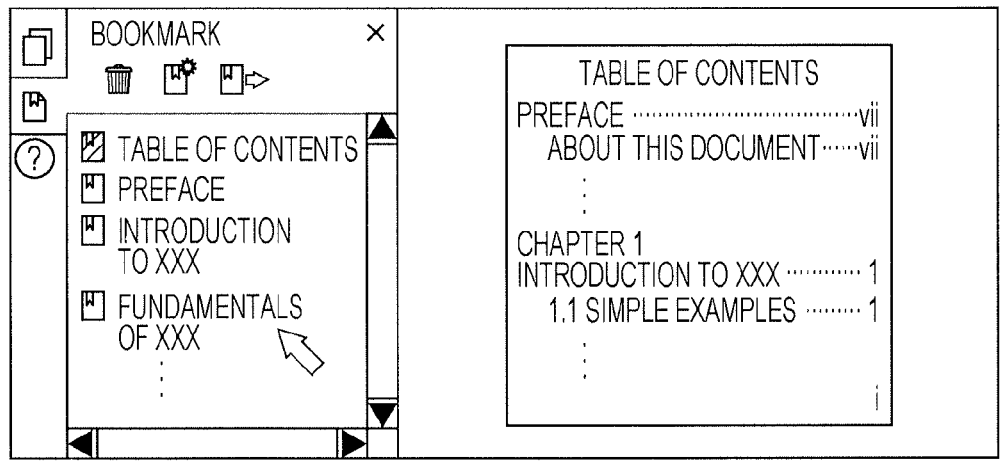
FIGS. 12A and 12B illustrate displayed examples of the electronic bookmarked information.
Figure 12B:
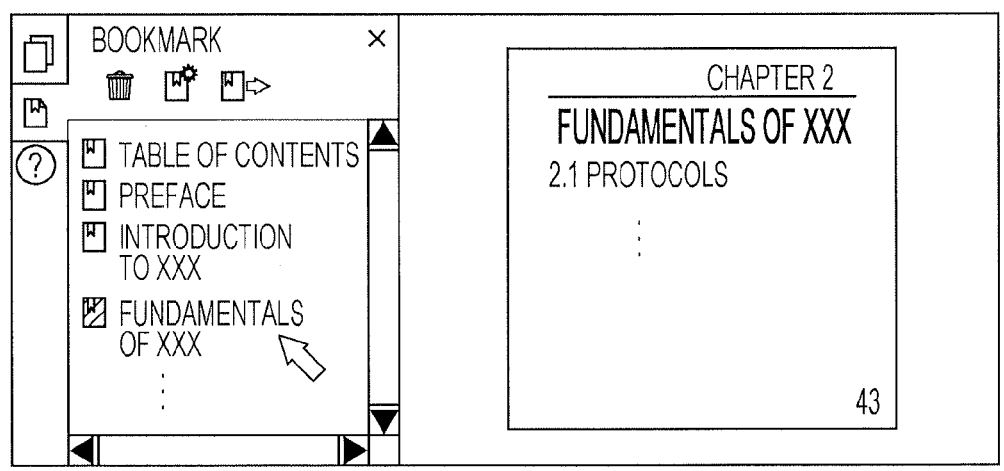

FIGS. 12A and 12B illustrate displayed examples of the electronic bookmarked information. FIGS. 12A and 12B illustrate an example of screens displayed when the electronic bookmarked information created in the manner described above is being viewed. In the illustrated examples, an image read by the reading unit 11 is displayed, and a list of heading items included in the added bookmark information is also displayed.

In FIG. 12A, first, the image of a table of contents page, which is an image read by the reading unit 11, is displayed, and a list of heading items is also displayed as bookmark information. In the illustrated example, the heading item "Table Of Contents" is included, and a list of heading items also includes the heading item "Table Of Contents".

In order to refer to the content of the "Fundamentals of xxx" in the display screen illustrated in FIG. 12A, the "Fundamentals of xxx" pointed to by the arrow may be specified from the list of heading items. Once the "Fundamentals of xxx" is specified, as illustrated in FIG. 12B, the display screen is changed from the image of the table of contents page to the image of the page including the header "Fundamentals of xxx". Accordingly, once an item is selected and specified from a list of heading items displayed based on bookmark information, the image of the desired page may be displayed.

Even after the image of the desired page is displayed, the list of heading items displayed based on the bookmark information is still displayed. Thus, in order to display the image of another page, the image may be selected and specified from the displayed list of heading items. Then, the image of the page including the desired heading item is displayed. In the related art, since each item in a table of contents is associated with the image of a page corresponding to the item, in order to display the image of another desired page, the user returns to the table of contents before specifying the desired item. In the illustrated example, once a desired heading item is specified from a list of heading items displayed based on bookmark information, the image of the page of this heading item may be displayed without requiring the user to return to the table of contents.

It is to be noted that a function for, using a technique of the related art, specifying each item in a table of contents, which is linked to a corresponding one of the main body pages, thereby displaying the page including the item may also be included. In addition, various functions regarding an electronic document, such as links from the index or links to illustrations, may also be used.

Figure 4A:
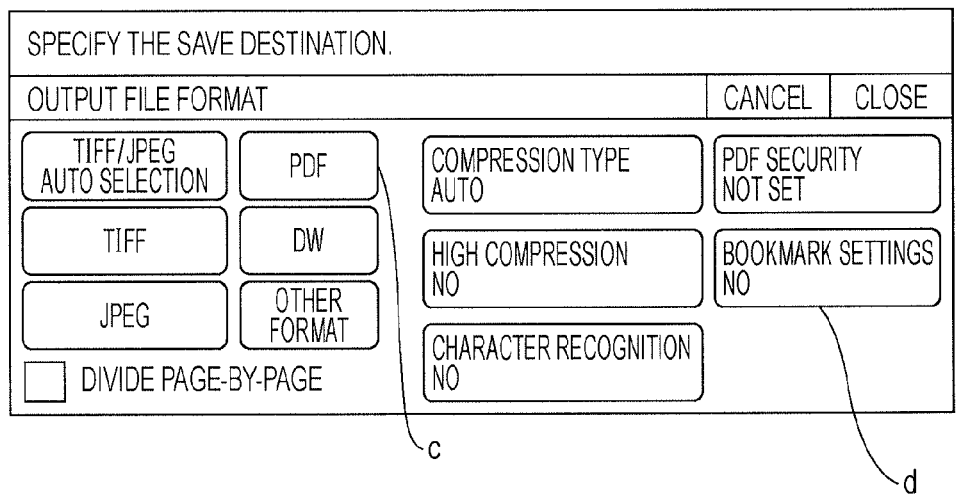
FIGS. 4A and 4B illustrate a continuation of the examples of the screens for performing setting when reading a document illustrated in FIGS. 3A and 3B.

In the foregoing specific examples, for example, the displayed example illustrated in FIG. 4A or the electronic bookmarked information illustrated in FIGS. 11A and 11B is an example based on PDF. The exemplary embodiment is not limited to the illustrated example, and may be applied to a variety of types of electronic bookmarked information in which electronically bookmarked items are displayed in the list.

Figure 13:
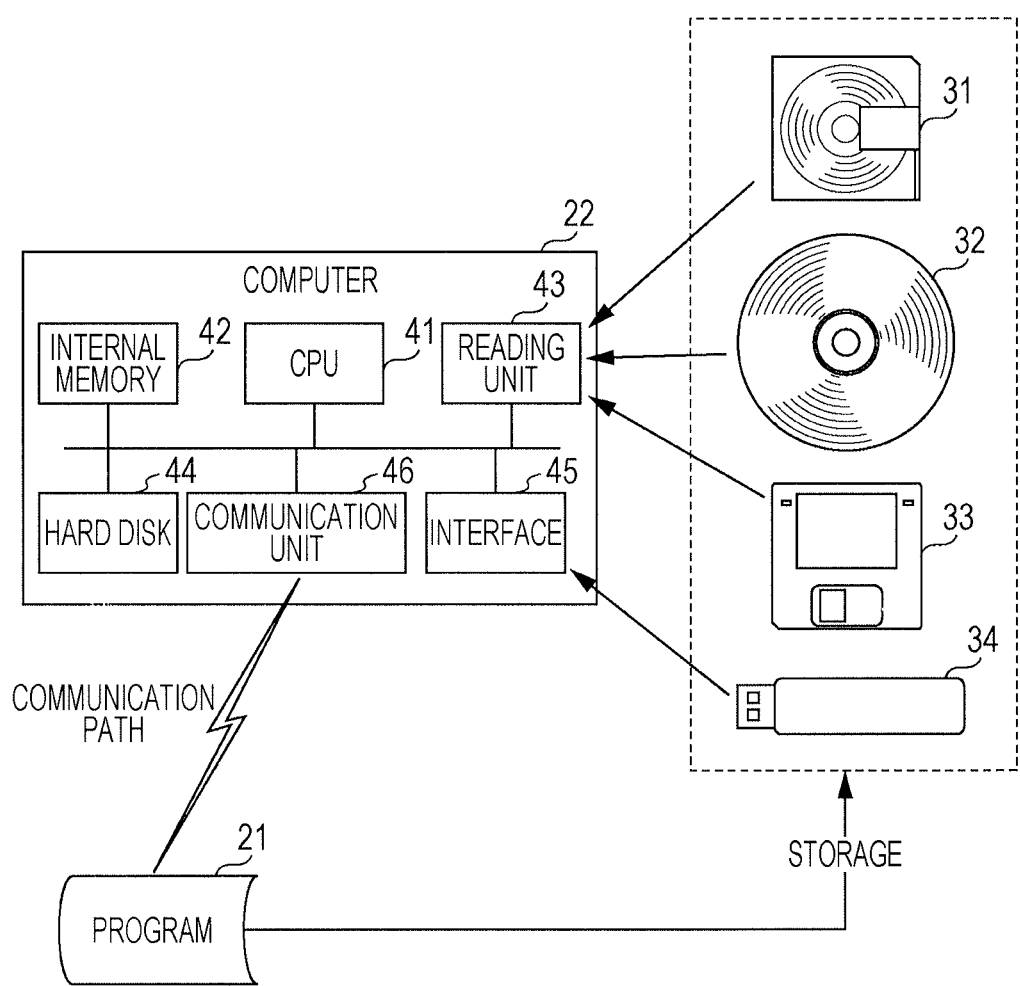
FIG. 13 illustrates an example of a computer program which implements functions described in the exemplary embodiment of the present invention, a storage medium storing the computer program, and a computer.

FIG. 13 illustrates an example of a computer program which implements the functions described in the exemplary embodiment of the present invention, a storage medium storing the computer program, and a computer.

All or some of the functions of the respective units described above in the exemplary embodiment of the present invention may be implemented by a program 21 executable on a computer 22. In this case, the program 21, data used in the program 21, and the like may be stored in a non-volatile storage medium readable by the computer 22. The term "non-volatile storage medium", as used herein, means a medium in which changes in energy such as magnetic energy, optical energy, or electric energy are induced in accordance with the content of the program 21 and the content of the program 21 is transmitted to a reading unit 43 provided in a hardware resource of the computer 22 in the form of corresponding signals. Examples of the non-volatile storage medium include a magneto-optical disk 31, an optical disk 32 (including a compact disc (CD) and a digital versatile disc (DVD)), a magnetic disk 33, and a memory 34 (including an integrated circuit (IC) card, a memory card, and a flash memory). The above storage media may not necessarily be portable.

The program 21 may be stored in the above storage media. A storage medium storing the program 21 is placed in, for example, the reading unit 43 or an interface 45 of the computer 22 to read the program 21 from the computer 22. The read program 21 is stored in an internal memory 42 or a hard disk 44 (including a magnetic disk and a silicon disk), and a central processing unit (CPU) 41 executes the program 21 to implement all or some of the functions described above in the exemplary embodiment of the present invention. Alternatively, the program 21 may be transferred to the computer 22 via a communication path. In the computer 22, the program 21 may be received at a communication unit 46 and may be stored in the internal memory 42 or the hard disk 44, and the CPU 41 may execute the program 21 to implement all or some of the functions described above in the exemplary embodiment of the present invention.

The computer 22 may be connected to various devices via the interface 45. For example, a display that displays information may be connected to the computer 22, and may display screens for performing the operations described with reference to FIGS. 3A, 3B, 4A, and 4B or viewing the electronic bookmarked information described with reference to FIGS. 12A and 12B. In addition, an input device that receives information from a user may be connected to the computer 22, and may receive the specifying operations described with reference to FIGS. 3A, 3B, 4A, and 4B. It is to be noted that the display and the input device may be formed into a single unit such as a touch panel. Other devices may also be connected to the computer 22. Each configuration may not necessarily be operated by a single computer, and processing may be executed by other computers in accordance with the processing stage.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor;
   memory storing executable instructions that, when executed by the processor, causes the processor to perform:
   reading an image of a table of contents page and an image of a main body page;
   performing character recognition to recognize a character in the image of the table of contents page and a character in the image of the main body page;
   analyzing the image of the table of contents page and acquiring at least a heading item in accordance with a result of the character recognition;
   analyzing the image of the main body page and associating a second image, included in the image of the main body page, including the heading item with the acquired heading item in accordance with a result of the character recognition; and
   creating electronic bookmarked information in which bookmark information for associating the acquired heading item with the second image is added to electronic information of the read images,
   wherein the created electronic bookmarked information is configured to be concurrently and distinctly displayed with at least one of the image of the table of contents page and the image of the main body page, and
   wherein the reading comprises handling a predetermined number of images as table of contents pages, and subsequent images as main body pages.

2. The information processing apparatus according to claim 1, wherein the reading comprises identifying the table of contents page and the main body page in accordance with a result of layout analysis and a result of the character recognition.

3. The information processing apparatus according to claim 2, wherein the analyzing the image of the main body page comprises performing layout analysis on the image of the main body page to extract an area of a header, and associating the header with the acquired heading item in accordance with a result of character recognition.

4. The information processing apparatus according to claim 1, wherein the analyzing the image of the main body page comprises performing layout analysis on the image of the main body page to extract an area of a header, and associating the header with the acquired heading item in accordance with a result of character recognition.

5. The information processing apparatus according to claim 1, wherein the analyzing the image of the table of contents page and acquiring at least the heading item comprises acquiring the heading item and a page number corresponding to the heading item, and
   the analyzing the image of the main body page and associating the second image comprises associating the acquired heading item with the second image in accordance with (i) a result of character recognition performed on an area of the image of the main body page including the page number and (ii) the page number corresponding to the heading item.

6. An information processing apparatus comprising:
   a processor;
   memory storing executable instructions that, when executed by the processor, causes the processor to perform:
   reading an image of a table of contents page and an image of a main body page;
   performing character recognition to recognize a character in the image of the table of contents page and a character in the image of the main body page;
   analyzing the image of the table of contents page and acquiring at least a heading item in accordance with a result of the character recognition;
   analyzing the image of the main body page and associating a second image, included in the image of the main body page, including the heading item with the acquired heading item in accordance with a result of the character recognition; and
   creating electronic bookmarked information in which bookmark information for associating the acquired heading item with the second image is added to electronic information of the read images,
   wherein the created electronic bookmarked information is configured to be concurrently and distinctly displayed with at least one of the image of the table of contents page and the image of the main body page, and
   wherein the reading comprises detecting a color sheet, and handling an image before the color sheet as a table of contents page and an image subsequent to the color sheet as a main body page.

7. A non-transitory computer readable medium storing a program causing a computer to execute a process for performing information processing, the process comprising:
   reading an image of a table of contents page and an image of a main body page;
   performing character recognition to recognize a character in the image of the table of contents page and a character in the image of the main body page;
   analyzing the image of the table of contents page and acquiring at least a heading item in accordance with a result of the character recognition;
   analyzing the image of the main body page and associating a second image, included in the image of the main body page, including the heading item with the acquired heading item in accordance with a result of the character recognition; and creating electronic bookmarked information in which bookmark information for associating the acquired heading item with the second image is added to electronic information of the read images, wherein the created electronic bookmarked information is configured to be concurrently and distinctly displayed with at least one of the image of the table of contents page and the image of the main body page, and wherein the reading comprises handling a predetermined number of images as table of contents pages, and subsequent images as main body pages.

8. An information processing method comprising:

reading an image of a table of contents page and an image of a main body page;

performing character recognition to recognize a character in the image of the table of contents page and a character in the image of the main body page;

analyzing the image of the table of contents page and acquiring at least a heading item in accordance with a result of the character recognition;

analyzing the image of the main body page and associating a second image, included in the image of the main body page, including the heading item with the acquired heading item in accordance with a result of the character recognition; and creating electronic bookmarked information in which bookmark information for associating the acquired heading item with the second image is added to electronic information of the read images, wherein the created electronic bookmarked information is configured to be concurrently and distinctly displayed with at least one of the image of the table of contents page and the image of the main body page, and wherein the reading comprises handling a predetermined number of images as table of contents pages, and subsequent images as main body pages.

9. A non-transitory computer readable medium storing a program causing a computer to execute a process for performing information processing, the process comprising:

reading an image of a table of contents page and an image of a main body page;

performing character recognition to recognize a character in the image of the table of contents page and a character in the image of the main body page;

analyzing the image of the table of contents page and acquiring at least a heading item in accordance with a result of the character recognition;

analyzing the image of the main body page and associating a second image, included in the image of the main body page, including the heading item with the acquired heading item in accordance with a result of the character recognition; and creating electronic bookmarked information in which bookmark information for associating the acquired heading item with the second image is added to electronic information of the read images, wherein the created electronic bookmarked information is configured to be concurrently and distinctly displayed with at least one of the image of the table of contents page and the image of the main body page, and wherein the reading comprises detecting a color sheet, and handling an image before the color sheet as a table of contents page and an image subsequent to the color sheet as a main body page.

10. An information processing method comprising:

reading an image of a table of contents page and an image of a main body page;

performing character recognition to recognize a character in the image of the table of contents page and a character in the image of the main body page;

analyzing the image of the table of contents page and acquiring at least a heading item in accordance with a result of the character recognition;

analyzing the image of the main body page and associating a second image, included in the image of the main body page, including the heading item with the acquired heading item in accordance with a result of the character recognition; and creating electronic bookmarked information in which bookmark information for associating the acquired heading item with the second image is added to electronic information of the read images, wherein the created electronic bookmarked information is configured to be concurrently and distinctly displayed with at least one of the image of the table of contents page and the image of the main body page, and wherein the reading comprises detecting a color sheet, and handling an image before the color sheet as a table of contents page and an image subsequent to the color sheet as a main body page.

* * * * *